US010938727B2

(12) United States Patent
Murugesan et al.

(10) Patent No.: US 10,938,727 B2
(45) Date of Patent: *Mar. 2, 2021

(54) METHOD AND DEVICE FOR OFFLOADING PROCESSING OF DATA FLOWS

(71) Applicant: Cisco Technology, Inc., San Jose, CA (US)

(72) Inventors: Prasannakumar Murugesan, San Ramon, CA (US); Ajeet Pal Singh Gill, Fremont, CA (US); Aeneas Sean Dodd-Noble, Andover, MA (US); David A. Johnson, Nashua, NH (US); Ian McDowell Campbell, Littleton, CO (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/458,829

(22) Filed: Jul. 1, 2019

(65) Prior Publication Data

US 2019/0327177 A1  Oct. 24, 2019

Related U.S. Application Data

(63) Continuation of application No. 15/791,616, filed on Oct. 24, 2017, now Pat. No. 10,382,346.

(51) Int. Cl.
*H04L 12/851* (2013.01)
*H04L 12/721* (2013.01)
(Continued)

(52) U.S. Cl.
CPC .......... *H04L 47/2483* (2013.01); *G06F 13/00* (2013.01); *G06F 13/128* (2013.01); *H04L 45/38* (2013.01)

(58) Field of Classification Search
None
See application file for complete search history.

(56) References Cited

U.S. PATENT DOCUMENTS 8,930,690 B2    1/2015 Zuo et al.
9,130,879 B2    9/2015 Petrus et al.
(Continued)

FOREIGN PATENT DOCUMENTS

WO    2016/210210 A1    12/2016

OTHER PUBLICATIONS

Efraim, Rony, and Or, Gerlitz, "Using SR-IOV offloads with Open-vSwitch and similar applications" (Slides), NetDev 1.2, Nov. 1, 2016, Tokyo, Japan (Year: 2016).*

(Continued)

*Primary Examiner* — Charles C Jiang
*Assistant Examiner* — Saad Khawar

(57) ABSTRACT

In accordance with various implementations, a method is performed at a data plane node with one or more processors, non-transitory memory, and a control interface between a network function module associated with the data plane node and a switch associated with the data plane node. The method includes determining whether an offload capability is available for a data flow received at an ingress network interface of the data plane node. The method also includes determining whether the data flow satisfies offload criteria in response to determining that the offload capability is available. The method includes bypassing the network function module associated with the data plane node and providing the data flow to at least one of the switch associated with the data plane node or an egress network interface associated with the data plane node in response to determining the offload capability is available and the offload criteria is satisfied.

20 Claims, 9 Drawing Sheets

(51) Int. Cl.
*G06F 13/12* (2006.01)
*G06F 13/00* (2006.01)

(56) References Cited

U.S. PATENT DOCUMENTS

| | | | |
|---|---|---|---|
| 9,614,747 B2 | 4/2017 | Karino | |
| 9,860,166 B1* | 1/2018 | Kwan | H04L 45/74 |
| 2006/0233174 A1* | 10/2006 | Rothman | H04L 45/28 370/392 |
| 2014/0112135 A1 | 4/2014 | Huang et al. | |
| 2015/0319250 A1* | 11/2015 | Vasudevan | H04L 29/08 709/228 |
| 2016/0150055 A1 | 5/2016 | Choi | |
| 2017/0010915 A1* | 1/2017 | Roy | G06F 9/4881 |
| 2017/0288972 A1 | 10/2017 | Li et al. | |
| 2018/0006934 A1 | 1/2018 | Cui et al. | |
| 2019/0124013 A1 | 4/2019 | Murugesan et al. | |

OTHER PUBLICATIONS

Using SR-IOV offloads with Open-vSwitch and similar applications (Paper), NetDev 1.2, Dec. 1, 2016, Tokyo, Japan (Year: 2016).*

Efraim, Rony, and Or, Gerlitz, "Using SR-IOV offloads with Open-vSwitch and similar applications" (Slides), NetDev 1.2, Nov. 1, 2016, Tokyo, Japan.

Efraim, Rony, and Or, Gerlitz, "Using SR-IOV offloads with Open-vSwitch and similar applications" (Papers), NetDev 1.2, Dec. 1, 2016, Tokyo, Japan.

International Search Report and Written Opinion in counterpart International Application No. PCT/US2018/056810, dated Dec. 21, 2018, 12 pages.

"Hardware acceleration", https://help.fortinet.com/fos50hlp/54/Content/FortiOS/fortigate-whats-n . . . , downloaded from the Internet on Feb. 7, 2019, 3 pages.

Johanna Heinonen, et al., "Dynamic Tunnel Switching for SDN-Based Cellular Core Networks", AllThingsCellular '14, Chicago, IL, Aug. 22, 2014, 12 pages.

CORD Project, Whitepaper, "M-CORD as an Open Reference Solution for 5G Enablement", OpenCORD.org, Nov. 2016, 12 pages.

Ryan Saunders, et al., "P2P Offloading in Mobile Networks using SDN", SOSR '16, Mar. 14-15, 2016, Santa Clara, CA, 7 pages.

Yanfang Le, et al. "UNO: Unifying Host and Smart NIC Offload for Flexible Packet Processing", SoCC '17, Sep. 24-27, 2017, Santa Clara, CA, 14 pages.

White Paper, "Agilio OVS Software Architecture", Netronome Systems, Inc., Jan. 2016, 6 pages.

Lesokhin, Ilya et al., "Flow-based tunneling for SR-ION/ using switchdev API", Proceedings of netdev 1.1, Feb. 10-12, 2016, 4 pages.

* cited by examiner

METHOD AND DEVICE FOR OFFLOADING PROCESSING OF DATA FLOWS

CROSS REFERENCE TO RELATED APPLICATION

This application is a continuation of U.S. application Ser. No. 15/791,616, filed Oct. 24, 2017, and entitled, "Method and Device for Offloading Processing of Data Flows," the entirety of which is incorporated herein by reference.

TECHNICAL FIELD

The present disclosure generally relates to forwarding data, and in particular, to systems, methods, and devices for offloading processing of data flows.

BACKGROUND

Under some circumstances, within the 5G mobile access architecture, a network function module (e.g., a virtualized network function (VNF) handler/forwarder) of a user plane function (UPF) node handles very high data rates and is often hosted on infrastructure that contains a switch (e.g., a virtual switch).

In these cases, packets are typically processed at least two times after being received at a network interface of the UPF node: once by the switch, and again by the application running in the network function module that forwards the packets and optionally performs some light touch processing. To this end, there is a performance penalty associated with sending packets to the network function module or container for processing as the packets traverse the network interface, switch, and network function module. Some transactions, such as general packet radio service (GPRS) tunneling protocol (GTP) encapsulation/decapsulation and network service header (NSH) processing, could be done more efficiently if handled by the network function virtualization infrastructure (NFVI) forwarder or a network interface (e.g., a network interface card (NIC)) of the UPF node instead of by the network function module.

However, programming the switch to handle internet protocol (IP) flows that are very frequent and often transient by way of a software defined network (SDN) controller is both unscalable and time intensive due to the latency involved in sending controls signals between the SDN controller and the switch. Furthermore, access to the NFVI from a network function module or associated application is usually not permitted under most network function virtualization (NFV) and data center policies due to security concerns.

DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
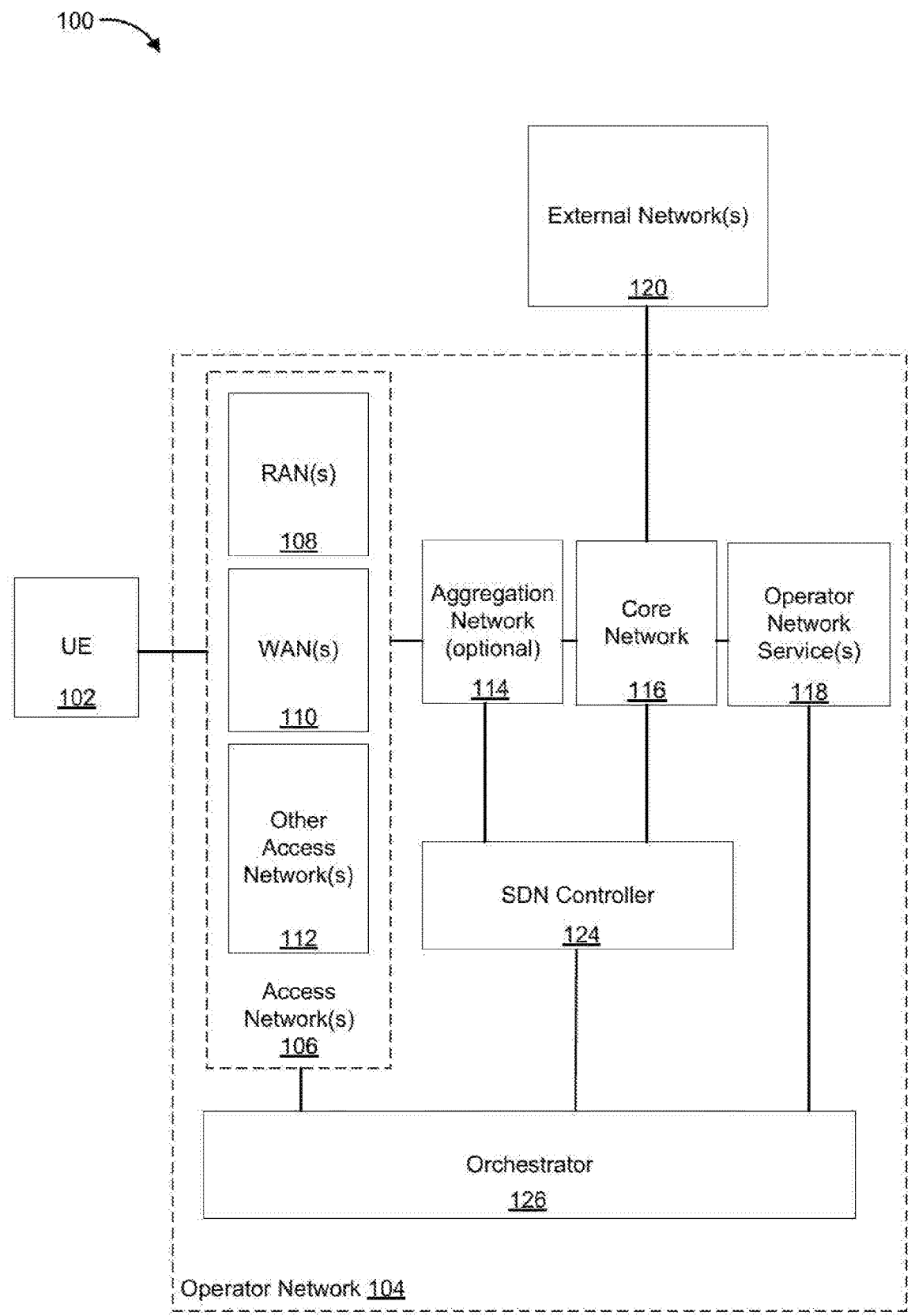
FIG. 1 is a block diagram of an example data delivery environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Various implementations disclosed herein include devices, systems, and methods for offloading processing of data flows. For example, in some implementations, a method is performed at a data plane node with one or more processors, non-transitory memory, and a control interface between a network function module associated with the data plane node and a switch associated with the data plane node. The method includes determining whether an offload capability is available for a data flow received at an ingress network interface of the data plane node. The method also includes determining whether the data flow satisfies offload criteria in response to determining that the offload capability is available. The method further includes bypassing the network function module associated with the data plane node and providing the data flow to at least one of the switch associated with the data plane node or an egress network interface associated with the data plane node in response to determining that the offload capability is available and in response to determining that the offload criteria is satisfied.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

EXAMPLE EMBODIMENTS

FIG. 1 is a block diagram of an example data delivery environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the data delivery environment 100 includes an operator network 104 that receives and transmits data between user equipment (UE) 102 and one or more operator network services 118, and/or one or more external networks 120.

In some implementations, the UE 102 includes a suitable combination of hardware (physical or virtualized), software, and/or firmware. As will be appreciated by one of ordinary skill in the art, although FIG. 1 depicts one UE 102, the data delivery environment 100 includes an arbitrary number of UEs in various other implementations. For example, the UE 102 corresponds to a desktop computer, laptop computer, mobile phone, tablet, wearable computing device, set-top box (STB), over-the-top (OTT) box, gaming console, or the like.

In some implementations, the operator network 104 includes one or more access networks (ANs) 106, which include one or more radio access networks (RANs) 108, one or more wide access networks (WANs) 110, and/or one or more other ANs 112. In some implementations, the operator network 104 also includes a core network 116, one or more operator network services 118, a software defined network (SDN) controller 124, and an orchestrator 126. In some implementations, the operator network 104 optionally includes an aggregation network 114. In some implementations, the operator network 104 corresponds more generally to a service provider (SP) that provides mobile access, fixed access, satellite access, or the like to content and communications.

In some implementations, the operator network 104 also receives and transmits data to one or more external networks 120, which optionally include receiving data from and transmitting data to the Internet, content delivery network (CDN) servers, application servers, or the like.

In some implementations, at least one of the one or more RANs 108 correspond to radio access networks (RANs) that implement radio access technology to provide connectivity via wireless communication to the UE 102 communicatively connected to the operator network 104. In one example, at least one of the one or more RANs 108 correspond to a 5G mobile access network that includes 5G base stations and the like.

In some implementations, at least one of the one or more WANs 110 implements non-radio access technology provide connectivity via wired or wireless communication to the UE 102 communicatively connected to the operator network 104. For example, the non-radio access technology includes an IEEE 802.11x Wi-Fi network, a fiber optic network, an IEEE 802.3x Ethernet network, or the like.

In some implementations, at least one of the one or more other ANs 112 implements non-radio access technology to provide connectivity via wired or wireless communication to the UE 102 communicatively connected to the operator network 104. For example, the non-radio access technology includes a satellite network or the like.

In some implementations, the core network 116 provides IP routing and forwarding in order to deliver data between end points. For example, the end points include the one or more operator network services 118, the one or more external networks 120, the SDN controller 124, or the like.

In some implementations, the one or more operator network services 118 include wireless communication services to control the elements of the operator network 104 in order to monitor and deliver services to an end user (e.g., the UE 102). As one example, the one or more operator network services 118 optionally include radio spectrum allocation management, infrastructure and networking management, Quality of Service (QoS) policy enforcement, billing services, customer support services, security auditing services, infrastructure and networking maintenance, and/or the like. In another example, the one or more operator network services 118 include content delivery services such as an Internet Protocol (IP) multimedia subsystem (IMS). In yet another example, the one or more operator network services 118 include communication services such as voice-over Long-Term Evolution (VoLTE) or voice-over Internet Protocol (VoIP).

In some implementations, the aggregation network 114 combines multiple network connections in parallel to increase throughput and to provide redundancies in case one of the network connections should fail.

In some implementations, the operator network 104 includes the SDN controller 124 that is configured to manage flow control to enable intelligent networking. For example, the SDN controller 124 corresponds to an application that instructs networks on where to send packets based on the conditions of the operator network 104 and one or more protocol technologies (e.g., resource reservation protocol—traffic engineering (RSVP-TE) or the like). In another example, the SDN controller 124 maintains consistent protocol policies across the operator network 104. In some implementations, the SDN controller 124 is communicatively connected to the core network 116, the aggregation network 114, and the orchestrator 126.

In some implementations, the operator network 104 includes the orchestrator 126 that is configured to coordinate between the different elements within the operator network 104. In some implementations, the orchestrator 126 is communicatively connected to the one or more ANs 106, the SDN controller 124, and the operator network services 118.

Figure 2:
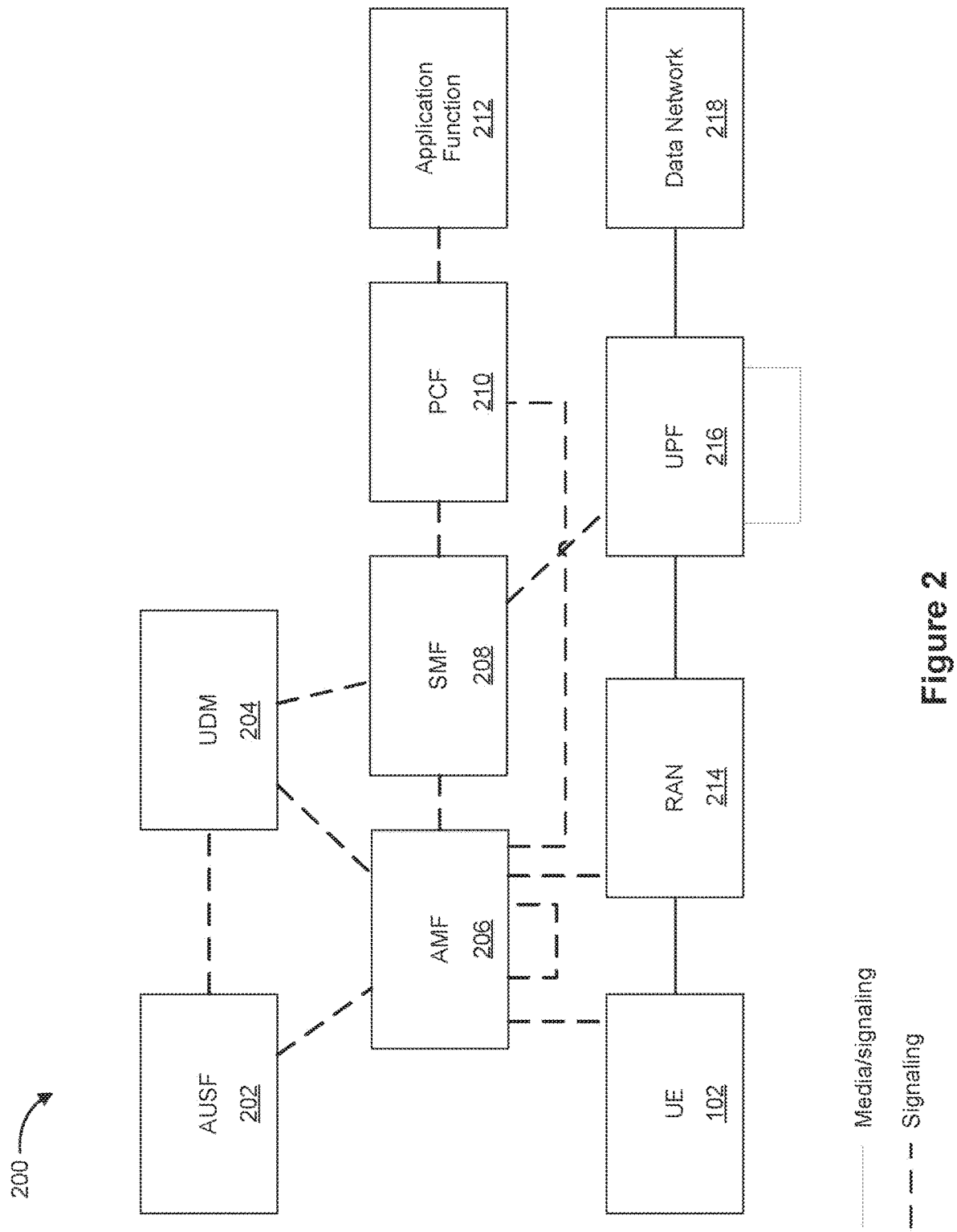
FIG. 2 is a block diagram of an example operator network in accordance with some implementations.

FIG. 2 is a block diagram of an example operator network 200 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operator network 200 corresponds to an operator network with a 5G architecture. According to some implementations, as shown in FIG. 2, the operator network 200 includes a user equipment (UE) (e.g., the UE 102 in FIG. 1), an authentication server function (AUSF) module 202, a unified data management (UDM) module 204, a core access and mobility management function (AMF) module 206, a session management function (SMF) module 208, a policy control function (PCF) module 210, an application function module 212, a RAN 214, a user plane function (UPF) module 216, and a data network 218.

In some implementations, the AUSF 202 is configured to facilitate authentication of an entity that attempts to access a network. As shown in FIG. 2, the AUSF 202 is communicatively coupled to the UDM 204 and the AMF 206. For example, the AUSF 202 is configured to perform security and privacy processes, such as data isolation between network slices, encryption/decryption, and/or the like.

In some implementations, the UDM 204 is configured to create a unified development and delivery environment that provides the UE 102 with access to consistent, accurate, and timely data. As shown in FIG. 2, the UDM 204 is communicatively coupled to the AUSF 202, the AMF 206, and the SMF 208.

In some implementations, the AMF 206 is configured to initiate paging and authentication of the mobile device (e.g., the UE 102). As shown in FIG. 2, the AMF 206 is communicatively coupled to the UE 102, the RAN 214, the AUSF 202, and the UDM 204. In some implementations, the AMF 206 is a user-plane function that includes mobile management capabilities.

In some implementations, the SMF 208 is configured to provide users/subscribers an option to save and restore sessions. As shown in FIG. 2, the SMF 208 is communicatively coupled to the UDM 204, the AMF 206, the PCF 210, and the UPF 216. For example, the SMF 208 is configured to save and restore one or more initial states associated with one or more applications. Further, for example, the initial states include the name of an open file, a displayed image, a video in progress, and/or the like.

In some implementations, the PCF 210 is configured to determine policy rules in a multimedia network. As shown in FIG. 2, the PCF 210 is communicatively coupled to the AMF 206, the SMF 208, and the application function module 212. For example, the PCF 210 designates policy in real-time via software.

In some implementations, the application function module 212 is configured to perform quality control for specific applications operating within a network. As shown in FIG. 2, the application function module 212 is communicatively coupled to the PCF 210. For example, quality control corresponds to evaluating QoS related to performance.

In some implementations, the RAN 214 implements radio access technology to provide connectivity via wireless communication to the UE 102 connected to the operator network 200. For example, the RAN 214 corresponds to a 5G mobile access network where the RAN 214 includes 5G base stations and the like. According to some implementations, the RAN 214 is configured to operate similarly to one of the one or more ANs 106 in FIG. 1. As shown in FIG. 2, the RAN 214 is communicatively coupled to the UE 102, the AMF 206, and the UPF 216.

In some implementations, the UPF 216 is configured to carry the traffic in the operator network 200. As shown in FIG. 2, the UPF is communicatively coupled to the RAN 214, the SMF 208, and the data network 218. In some implementations, the UPF 216 forwards traffic to a next-hop along the path to the selected destination data network (e.g., the data network 218). In some implementations, the data plane packets are transmitted through a delivery node (e.g., a router, a switch, and/or the like). To that end, the delivery node is configured to dispose of incoming and outgoing packets.

In some implementations, the data network 218 includes a router, switches, and/or the like. In some implementations, the data network 218 provides IP routing and forwarding for packets between end points. For example, the data network 218 corresponds to a portion of an operator network (e.g., the core network 110 of the operator network 104 in FIG. 1).

Figure 3:
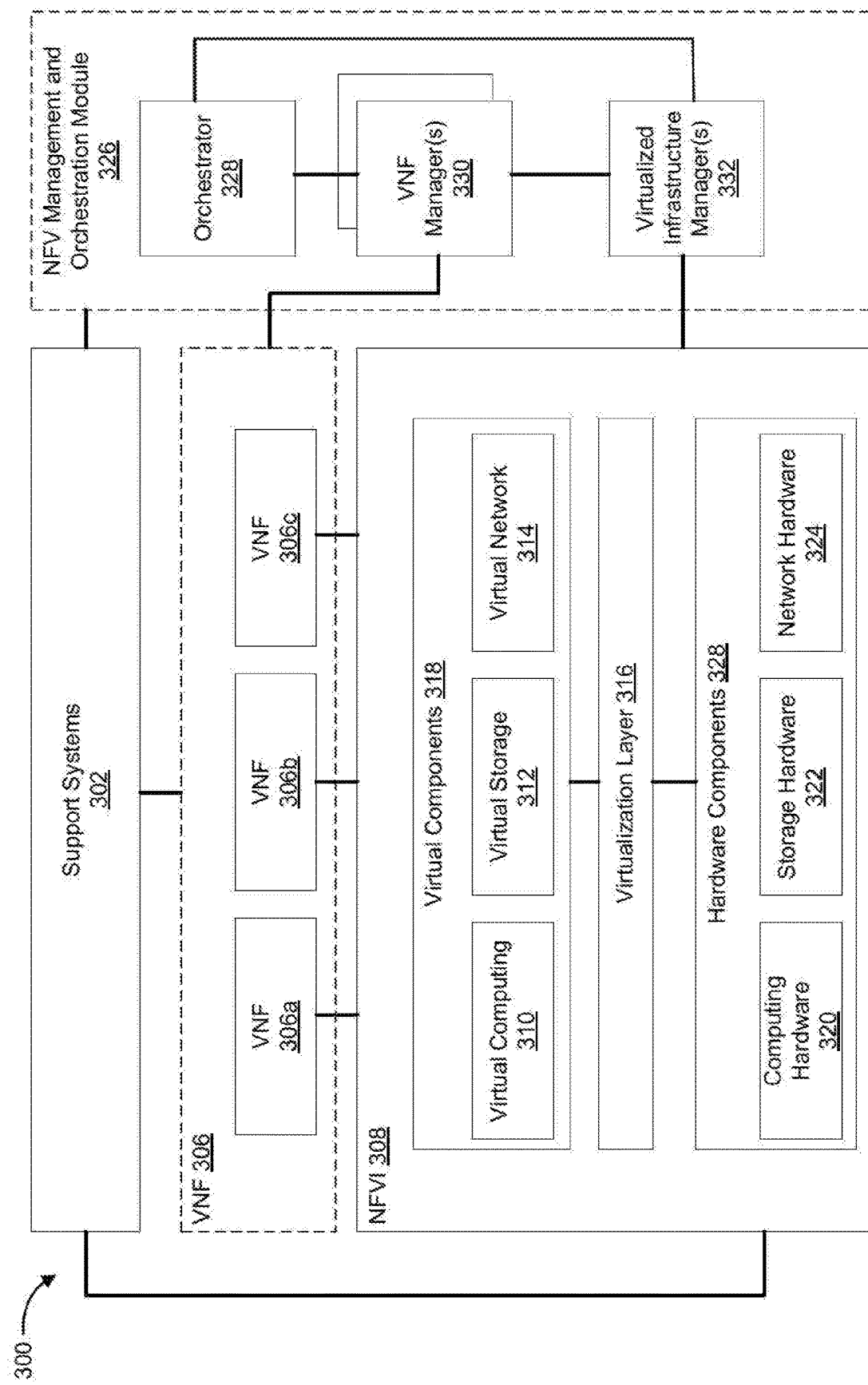
FIG. 3 is a simplified block diagram of a network function virtualization environment in accordance with some implementations.

FIG. 3 is a simplified block diagram of a network function virtualization (NFV) environment 300 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the NFV environment 300 includes support systems 302, one or more virtual network functions (VNFs) 306, network function virtualization infrastructure (NFVI) 308, and network function virtualization (NFV) management and orchestration module 326.

In some implementations, the support systems 302 are configured to manage and support the NFV environment 300. In some implementations, the support systems 302 are communicatively coupled to the NFV management and orchestration module 326 and the one or more VNFs 306. In some implementations, the support systems 302 corresponds to an operation support system (OSS), a business support system (BSS), and/or the like. In one example, the OSS corresponds to a computer system used by an operator network to manage management functions, including network inventory, service provisioning, network configuration, fault management, and/or the like. In another example, the BSS corresponds to a computer system used by the operator network to facilitate business operations, including product management, order management, revenue management, customer management, and/or the like. For example, the support systems 302 include a combination of the OSS and the BSS configured to support end-to-end telecommunication services.

In some implementations, the one or more VNFs 306 include software implementations of network functions (sometimes also referred to herein as "network functions modules") configured to consolidate and deliver networking components to support the NFVI 308. As will be appreciated by one of ordinary skill in the art, although FIG. 3 depicts three VNFs 306a, 306b, and 306c, the operator network environment 300 includes an arbitrary number of VNFs in various other implementations. For example, the one or more VNFs 306 correspond to a network address translation (NAT) service, firewall services, intrusion detection system, domain name service (DNS) service, caching service, and/or the like. In some implementations, the one or more VNFs 306 are communicatively coupled to the support systems 302, one or more VNF managers 330, and the NFVI 308. For example, as shown in FIG. 3, the one or more VNFs 306 are communicatively coupled to the NFVI via data paths or interfaces through which network traffic flows from or to the one or more VNFs 306.

In some implementations, the NFVI 308 includes software components, hardware components, and a virtualization layer configured to deliver network resources on which the one or more VNFs 306 are deployed. In some implementations, the NFVI 308 includes virtual components 318, a virtualization layer 316, and hardware components 328. In some implementations, the NFVI 308 is configured to host and connect virtual functions. For example, the NFVI 308 includes one or more of a server, hypervisor, operating system, virtual machine, virtual switch, network resources, and/or the like. In some implementations, the NFVI 308 is communicatively coupled to the one or more VNFs 306 and a virtual infrastructure manager (VIM) 332.

In some implementations, the hardware components 328 include computing hardware 320, storage hardware 322, and network hardware 324. In some implementations, the computing hardware 320 include one or more processing units (CPUs). In some implementations, the storage hardware 322 include high-speed random-access memory, such as DRAM, SRAM, DDR RAM, or other random access solid state memory devices. In some implementations, the storage hardware 322 include non-volatile memory, such as one or more magnetic disk storage devices, optical disk storage devices, flash memory devices, or other non-volatile solid-state storage devices. The storage hardware 322 optionally includes one or more storage devices remotely located from the computing hardware 320.

In some implementations, the network hardware 324 includes one or more switches, one or more routers, one or more wireless access points, one or more network interface controllers (NICs), and/or the like. In some implementations, the network hardware 324 is configured to mediate communication between devices on a computer network.

In some implementations, the virtual components 318 include virtual computing 310, virtual storage 312, and virtual network 314. In some implementations, the virtual components 318 are emulations of their respective hardware components 328. For example, the virtual components 318 correspond to a virtual machine which is an emulation of a computer system.

In some implementations, the virtualization layer 316 is configured to abstract resources from the hardware components 328 and deliver the resources to the respective one or more VNFs 306.

In some implementations, the NFV management and orchestration module 326 is configured to manage or orchestrate the resources for computing (e.g., the computing hardware 320), storage (e.g., the storage hardware 322), networking (e.g., the network hardware 324), and respective virtual resources (e.g., the virtual computing 310, the virtual storage 312, and the virtual network 314). In some implementations, the NFV management and orchestration module 326 includes an orchestrator 328, the one or more VNF managers 330, and the VIM 332.

In some implementations, the orchestrator 328 is configured to manage network services and VNF packages. For example, the orchestrator 328 is configured to manage network services including lifecycle, global resources, validation and authorization of NFVI resource requests and/or the like. In some implementations, the orchestrator 328 is communicatively coupled to the one or more VNF managers 330 and the VIM 332.

In some implementations, the one or more VNF managers 330 are configured to oversee operations regarding lifecycle management of VNF instances (e.g., VNFs 306*a*, 306*b*, and 306*c*). In some implementations, the one or more VNF managers 330 are communicatively coupled to the one or more VNFs 306 and the VIM 332. For example, the operations regarding lifecycle management of VNF instances include instantiation, scaling, updating and/or upgrading, termination, and/or the like.

In some implementations, the VIM 332 is configured to manage the resources from the NFVI 308. For example, the VIM 332 maintains inventory of the allocation of virtual resources to physical resources, supports the one or more VNF managers 330 by organizing virtual links, networks, subnets, and ports, manages security group policies to ensure access control, and/or the like. In another example, the VIM 332 manages a repository of NFVI hardware resources (e.g., the computing hardware 320, the storage hardware 322, and the network hardware 324) and software resources.

In some implementations, the VIM 332 is configured to manage hardware across a multidomain environment. For example, the VIM 332 corresponds to OPENSTACK, CLOUDSTACK, and/or the like.

Figure 4:
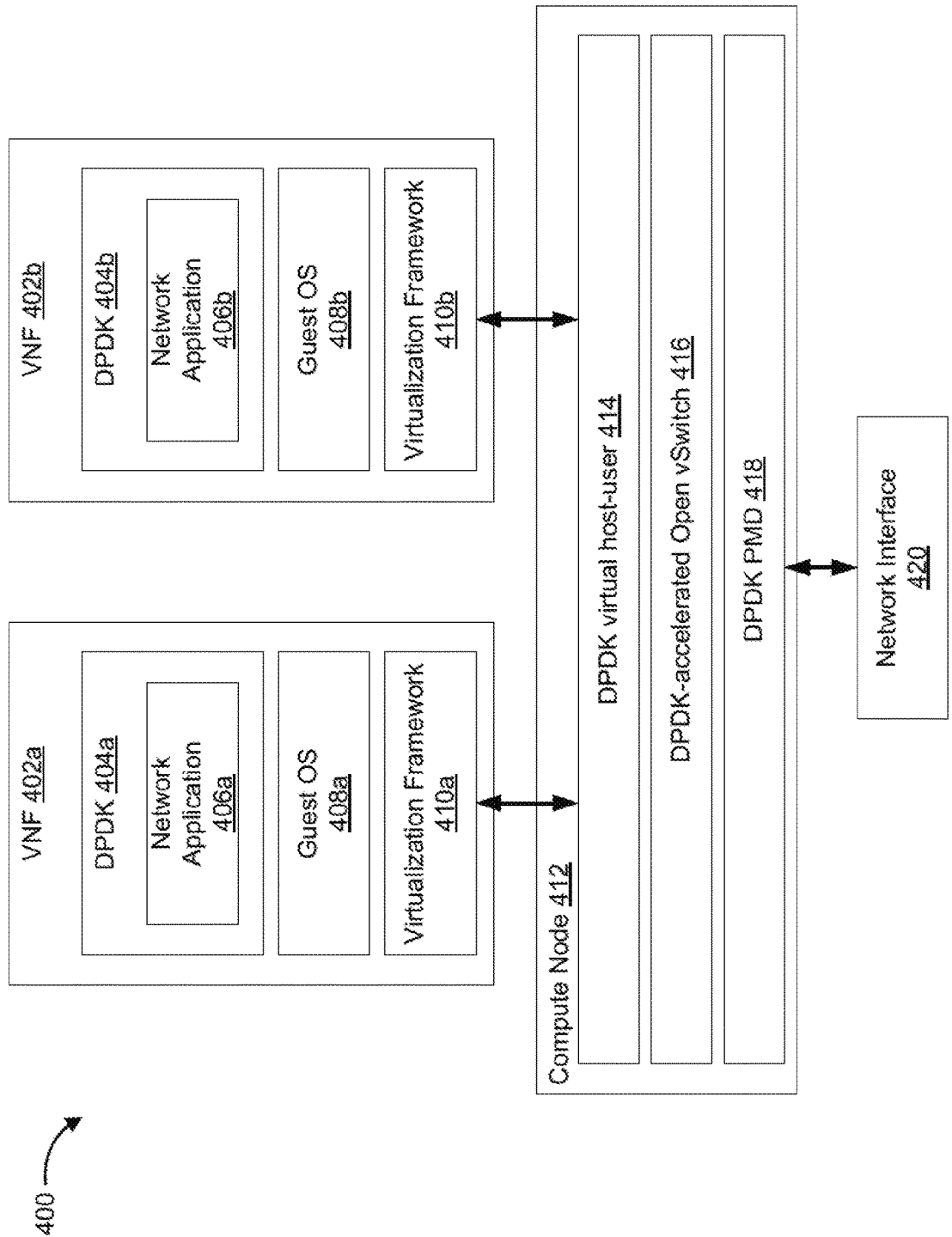
FIG. 4 is a block diagram of a virtual network function data path environment in accordance with some implementations.

FIG. 4 is a block diagram of a VNF data path environment 400 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the VNF data path environment 400 includes a VNF 402, a compute node 412, and a network interface 420. As will be appreciated by one of ordinary skill in the art, although FIG. 4 depicts two VNFs 402*a* and 402*b*, the VNF data path environment 400 includes an arbitrary number of VNFs in various other implementations.

As shown in FIG. 4, the VNF 402*a* includes a data plane development kit (DPDK) 404*a*, a guest operating system (OS) 408*a*, and a virtualization framework 410*a*. For example, the VNF 402*a* corresponds to one of the one or more VNFs 306 in FIG. 3. In some implementations, the VNF 402*a* is communicatively coupled to the compute node 412 via the virtualization framework 410*a*. As shown in FIG. 4, the VNF 402*b* is similar to and adapted from the VNF 402*a*. Thus, the VNF 402*b* has not been described for the sake of brevity.

According to some implementations, the DPDK 404*a* corresponds to a set of libraries and network interface controller drivers configured to process data packets. For example, the set of libraries provide an environment abstraction layer (EAL) configured to provide a standard programming interface to libraries, available hardware accelerators, other hardware elements, operating system (OS) elements (e.g., LINUX-based, BSD-based, proprietary OS, etc.), and/or the like. In some implementations, the set of libraries and network interface controller drivers correspond to a queue manager, a buffer manager, a memory manager, poll mode drivers (PMD), a packet framework, and/or the like.

In some implementations, the DPDK 404*a* is configured to provide a programming framework for one or more processors. For example, the one or more processors correspond to x86 processors or the like. In some implementations, the DPDK 404*a* includes a network application 406*a* configured to run on a client-server architecture. For example, the network application 406*a* corresponds to an application running on an operator network (e.g., the operator network 104 in FIG. 1).

In some implementations, the guest OS 408*a* is configured to run on a guest user equipment (UE). For example, the guest UE corresponds to the UE 102 in FIG. 1.

In some implementations, the virtualization framework 410*a* is configured to emulate an OS as a virtual OS. In one example, the virtualization framework 410*a* corresponds to a virtualization standard for network and disk device drivers for the guest OS 408*a*. In another example, the virtualization framework 410*a* is implemented via virtIO, an input/output virtualization framework in LINUX systems.

In some implementations, the compute node 412 includes a DPDK virtual host-user 414, a DPDK-accelerated open virtual switch (vSwitch) 416, and a DPDK PMD 418. For example, the compute node 412 corresponds to the virtual computing 310 in FIG. 3.

In some implementations, the DPDK virtual host-user 414 corresponds to a virtual host configured to run DPDK.

In some implementations, the DPDK-accelerated open vSwitch 416 corresponds to a platform for network automation. In some implementations, the DPDK-accelerated open vSwitch 416 includes open source software switch configured to be used as a vSwitch within virtualized server environments with DPDK functionalities, as described above. For example, the DPDK-accelerated open vSwitch 416 provides support for software defined network (SDN) ready interfaces and protocols. In another example, the DPDK-accelerated open vSwitch 416 serves as a compatible interface between the open vSwitch and a virtual host configured to run DPDK (e.g., the DPDK virtual host-use 414) internally to forward packets.

In some implementations, the DPDK PMD 418 includes application programming interfaces (APIs) provided through the Berkeley software distribution (BSD) hardware driver running in user space and communicates hardware with other hardware, to configure the devices and their respective queues. For example, the PMD boosts packet speeds across hardware in the compute node 412 and the network interface 420.

In some implementations, the network interface 420 is communicatively coupled with the DPDK PMD 418 in the computer node 412. For example, the network interface 420 corresponds to a network interface card (NIC) in a physical form or is implemented in software. In some implementations, the network interface 420 is configured to serve as an interconnect between the VNF (e.g., the one or more VNFs 306) and a user equipment (UE) (e.g., the UE 102 in FIG. 1) through which data flows.

Figure 5:
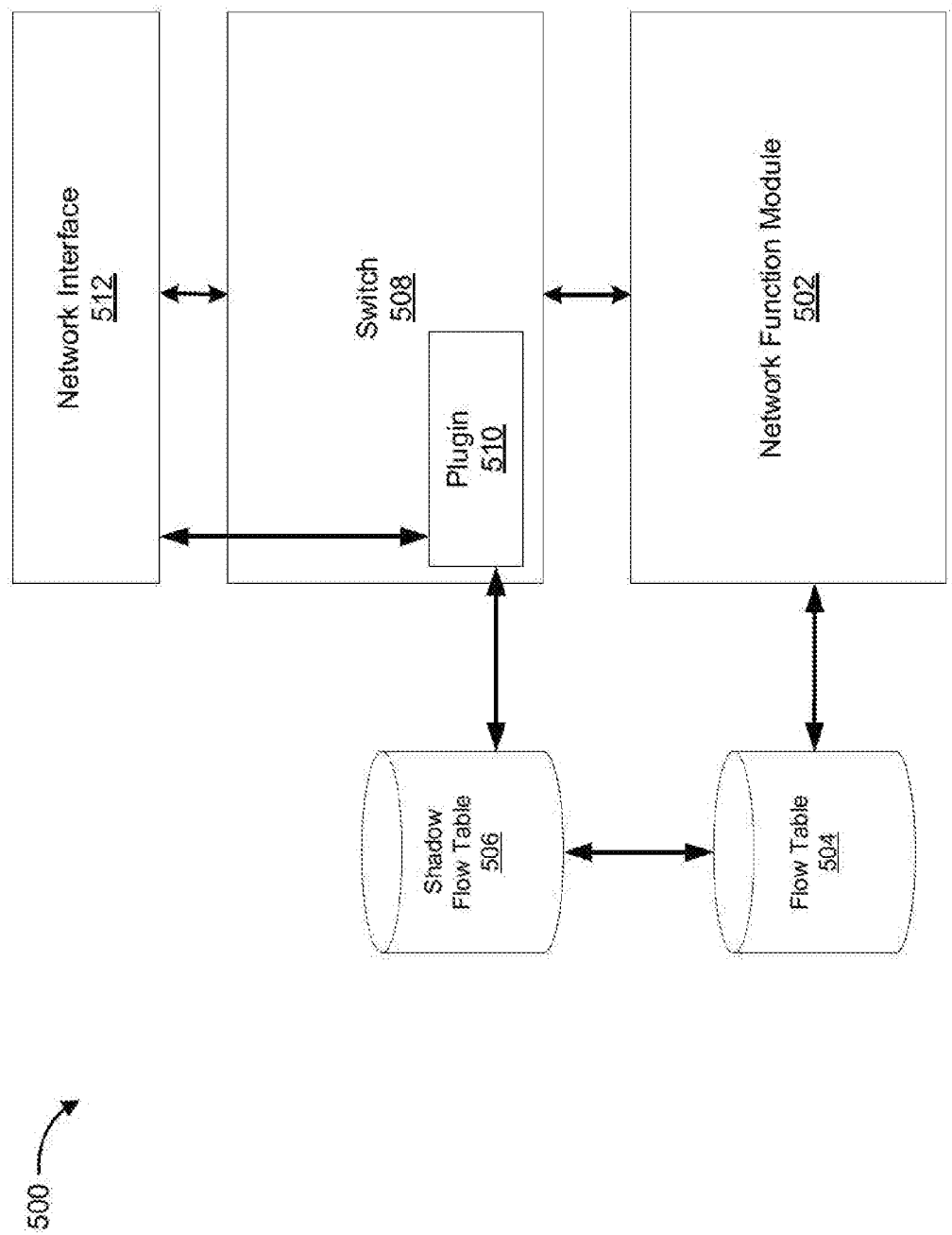
FIG. 5 is a simplified block diagram of a data flow environment in accordance with some implementations.

FIG. 5 is a simplified block diagram of a data flow environment 500 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the data flow environment 500 includes a network function module 502, a flow table 504, a shadow flow table 506, a switch 508, a plug-in 510, and a network interface 512. As such, in some implementations, the data flow environment 500 corresponds to a data plane node that is configured to facilitate in the determination of offloading a data flow and in the delivery of the data flow.

In some implementations, in a guest-host system such as in the data flow environment 500, the guest, includes the network function module 502 and the flow table 504. In some implementations, the host includes the network interface 512, the switch 508, and the shadow flow table 506.

In some implementations, the data flow environment 500 corresponds to a user plane function (UPF) in the 5G mobile access architecture (e.g., the UPF 216 in FIG. 2). In some implementations, the UPF includes a hardware layer (e.g., with one or more network interface cards (NICs)), a switch layer (e.g., a virtual switch), and a network function layer (e.g., the network function module 502 and the one or more NFVs 306 in FIG. 3). In some implementations, each layer of the data plane node corresponds to a suitable combination of hardware, software, or firmware. In some implementations, each layer of the data plane node is virtualized. In some implementations, each layer of the data plane node is located on a same device. In some implementations, each layer of the data plane node is located on a different device.

In some implementations, the network function module 502 corresponds to a VNF (e.g., the one or more VNFs 306 in FIG. 3) that is associated with a guest, virtual machine, a network application, or the like.

In some implementations, the flow table 504 is communicatively coupled to the network function module 502. In some implementations, the flow table 504 corresponds to a list of particular data flows that the switch 508 uses to index and access the data flows. For example, the flow table 504 supports the network function module 502 by enhancing traffic forwarding capability of the network function module 502. In some implementations, the flow table 504 is used by the network function module 502 for traffic classification.

In some implementations, the shadow flow table 506 is a subset of the flow table 504. In some implementations, the shadow flow table 506 contains similar data to the corresponding flow table 504 and the shadow flow table 506 is configured to be in the same format as the corresponding flow table 504. In some implementations, the shadow flow table 506 stores information relating to a history of modifications and functions operated on the flow table 504.

In some implementations, the flow table 504 and the shadow flow table 506 are communicatively coupled. For example, data flows can be offloaded to a shared memory base created by the coupled flow table 504 and the shadow flow table 506. In another example, the shared memory base is also referred to as a shared flow memory.

In some implementations, the switch 508 is associated with the data plane node. For example, the switch 508 is configured to be programmable to facilitate the switching and routing of data flows. In some implementations, the switch 508 corresponds to a virtual switch. For example, the virtual switch is a software application that allows communication between virtual machines. In another example, the virtual switch is configured to intelligently direct the communication and data flow by checking communication and data flow before forwarding to a particular destination. In some implementations, the switch 508 is configured to run network and security settings before forwarding data flow to the destination.

In some implementations, the plugin 510 is configured to perform operations related to the switch 508. For example, the plugin 510 can program the network interface 512. In one example, the plugin 510 can assist the switch in performing operations related to the behavior of the switch 508. In another example, the plugin 510 uses the shared memory in the shadow flow table 506 to perform operations.

In some implementations, the network interface 512 corresponds to a hardware component within the UPF that serves as an interface between a switch and a data network. In some implementations, the network interface 512 is sometimes referred to as a network interface card or network interface controller (NIC). For example, the network interface 512 is configured to communicate via physical layer and/or data link layer standards (e.g., Ethernet, fibre channels, Wi-Fi, and the like). In some implementations, the network interface 512 allows for communication between small clusters of user devices within a same network.

In some implementations, a purge function corresponds to the network function module 502 deleting the data flow of a user equipment (UE) that has detached from the network. In some implementations, after the UE detaches, the network function module 502 deletes the data flow immediately. In some implementations, after the UE detaches, the network function module 502 deletes the data flow after a set amount of time. Additionally, in some implementations, the switch 508 purges the data flow after a set amount of time exceeds a purge timer value.

Figure 6:
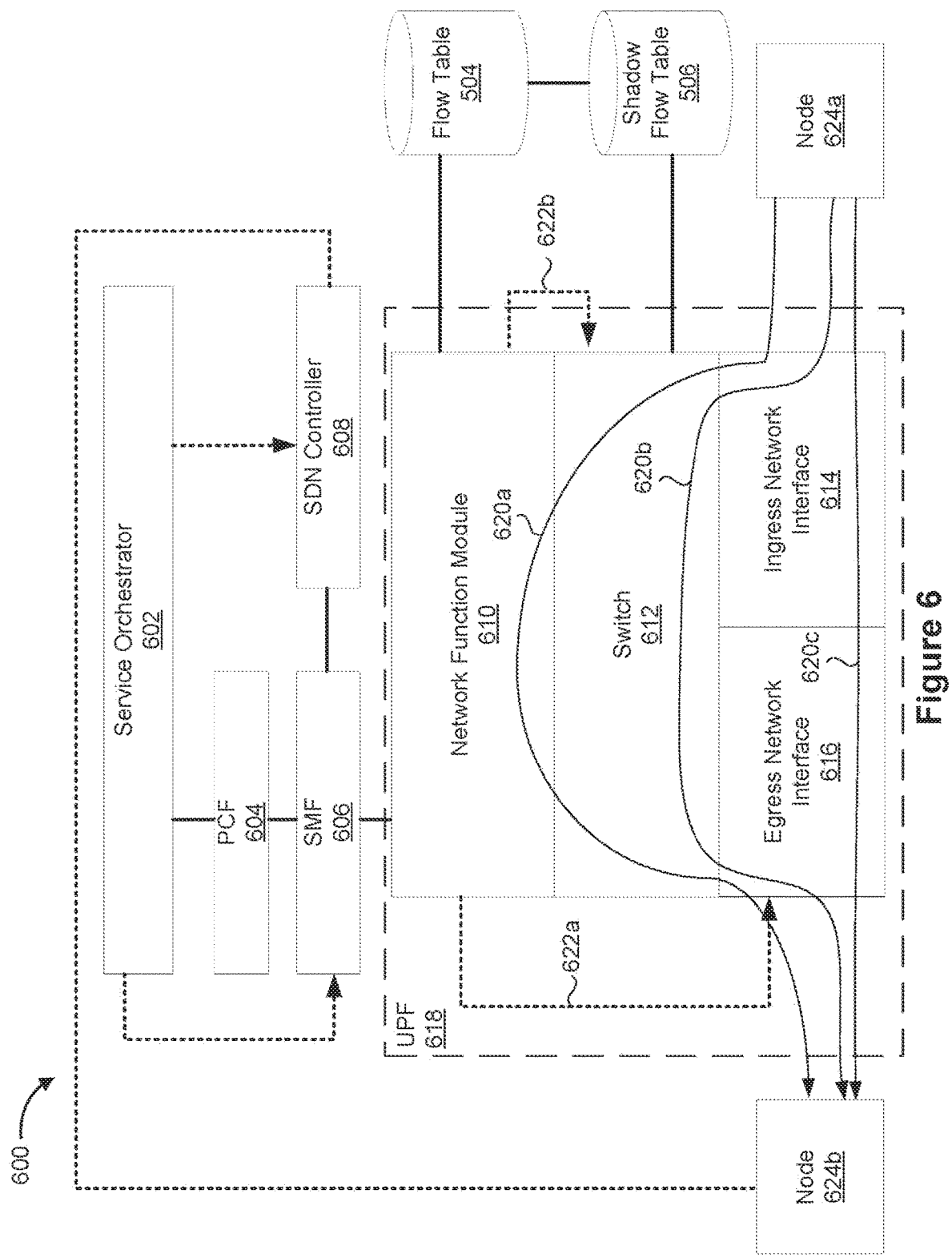
FIG. 6 is a block diagram of a data flow environment in accordance with some implementations.

FIG. 6 is a block diagram of a data flow environment 600 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the data flow environment 600 includes a service orchestrator 602, a policy control function (PCF) 604, a session management function (SMF) 606, a software defined network (SDN) controller 608, a user plane function (UPF) node 618, and one or more nodes 624. In some implementations, the UPF node 618 includes a network function module 610, a switch 612, an ingress network interface 614, and an egress network interface 616.

In some implementations, the service orchestrator 602 is configured to manage network services and VNF packages through the network function module 610. In some implementations, the service orchestrator 602 configures the policy, the SDN controller 608, and the SMF 606 with information that includes which of an information protocol (IP) to use. In some implementations, the service orchestrator 602 installs the security credentials for the switch 612 and the SMF 606. In some implementations, the service orchestrator 602 is communicatively coupled to the PCF 604, the SMF 606, and the SDN controller 608. In another example, the service orchestrator 602 corresponds to the orchestrator 328 in FIG. 3.

In some implementations, the PCF 604 is configured to determine policy rules in a network. For example, the PCF 604 corresponds to the PCF 210 in FIG. 2. In some implementations, the PCF 604 is communicatively coupled to the service orchestrator 602 and the SMF 606.

In some implementations, the SMF 606 is configured to provide users/subscribers an option to save and restore sessions. In some implementations, the SMF 606 is configured to provide security credentials to the UPF node 618 and the physical layer (e.g., the network interface 512 in FIG. 5). For example, the SMF 606 corresponds to the SMF 208 in FIG. 2. In some implementations, the SMF 606 is communicatively coupled to the PCF 604, the SDN controller 608, and the UPF node 618.

In some implementations, the SDN controller 608 is configured to manage data flow control to enable intelligent networking. For example, the SDN controller 608 corresponds to the SDN controller 124 in FIG. 1. In some implementations, the SDN controller 608 is communicatively coupled to the service orchestrator 602 and the SMF 606. For example, the SDN controller 608 communicates the capabilities of the switch 612 and the network function module 610 to the SMF 606.

In some implementations, the SDN controller 608 is configured to program the data flow processing rules so that when a data flow is defined, key performance indicators (KPIs) are reported to the UPF node 618 for processing. Further, in one example, the KPIs are reported to the SMF 606 for charging and analytics purposes.

In some implementations, the SDN controller 608 is configured to provide a flow filter to the switch 612 of the expected information that an application exposes in the shared flow memory (e.g., the flow table 504 and the shadow flow table 506). In one example, the flows are added and removed in the shared flow memory as and when the UPF node 618 determines that the flow can be offloaded.

In some implementations, the network function module 610 corresponds to the network function module 502 in FIG. 5 or one of the one or more VNFs 306 in FIG. 3. In some implementations, the network function module 610 includes software implementations of network functions configured to consolidate and deliver networking components to support an NFVI (e.g., the NFVI 308 in FIG. 3). For example, the communication between the network function module 610 and the SMF 606 includes a data path through which network traffic traverses.

According to some implementations, the switch 612 is configured to intelligently direct the communication and data flow between the network function module 610, the ingress network interface 614, and the egress network interface 616 by checking communications and data flows before forwarding to a particular destination. In some implementations, the switch 612 is configured to be programmable to facilitate the switching and routing of data flows. In some implementations, the switch 612 corresponds to a virtual switch. For example, the switch 612 corresponds to the switch 508 in FIG. 5.

In some implementations, the ingress network interface 614 and the egress network interface 616 correspond to the network interface 512 in FIG. 5. For example, the ingress network interface 614 and the egress network interface 616 correspond to elements of a NIC.

As one example, with reference to transmission path 620a in FIG. 6, a node 624a transmits a data flow (e.g., one or more packets of data) that arrives at the ingress network interface 614. Then, continuing with this example, the data flow traverses the switch 612, the network function module 610, back through the switch 612, out the egress network interface 616 and finally is forwarded to a node 624b. As such, in this example, the data flow is processed multiple times by the switch 612. As such, a transmission path 620a, as described above, is illustrated in FIG. 6.

In some implementations, the UPF node 618 is configured to determine whether an offload capability is available for the data flow received at the ingress network interface 614. In some implementations, the offload capability corresponds to offloading a processing operation/function to a lower level layer of the UPF node 618 (e.g., general packet radio service (GPRS) tunneling protocol (GTP) encapsulation/decapsulation). According to some implementations, determining whether an offload capability is available includes determining whether the network function module 610 has access to the switch 612 and/or the network interfaces 614 and 616. According to some implementations, determining whether the offload capability is available includes determining whether the switch 612 and/or the network interfaces 614 and 616 are programmable.

In some implementations, the network function module 610 transmits control signals 622a and 622b based at least in part by the security credentials associated with the SMF 606. In some implementations, the network function module 610 transmits the control signal 622a that corresponds to an instruction to offload a flow to the ingress network interface 614.

In some implementations, the network function module 610 transmits the control signal 622b that corresponds to an instruction to offload a flow to the switch 612. In one example, the SMF 606 instructs the network function module 610 to offload the flow directly to the switch 612. In another example, the network function module 610 transmits the control signal 622b in response to the UPF node 618 categorizing a non-direct offload to the switch 612.

In some implementations, the offload capability determination is triggered when a new data flow is received at the ingress network interface 614. In some implementations, the offload capability determination is triggered when a new data flow is next in a queue of data flows received at the ingress network interface 614.

Therefore, in some implementations, if the offload capability is not available, the UPF node 618 processes a data flow according to the transmission path 620*a* between when the offload capability is determined to be unavailable.

In some implementations, in response to determining that the offload capability is available, the UPF node 618 determines whether offload criteria is satisfied. According to some implementations, if the offload criteria is not satisfied, the UPF node 618 processes a data flow according to the transmission path 620*a*. For example, the offload criteria correspond to at least one of a data flow type criterion (e.g., best effort, voice, video, and/or the like), a bandwidth allotment, a latency criterion, a quality of service criterion (e.g., a service level agreement (SLA)), a usage allotment (e.g., number of minutes available/used), a destination IP address criterion, a source IP address criterion, and/or the like.

In some implementations, in response to determining that the offload capability is available and the offload criteria are satisfied, the data flow bypasses the network function module 610. In one example, if the switch 612 is available for offloading the data flow but the network interfaces 614 and 616 are not, the UPF node 618 processes a data flow according to the transmission path 620*b*. For example, the transmission path 620*b* includes the node 624*a*, the ingress network interface 614, the switch 612, the egress network interface 616, and the node 624*b*.

In some implementations, in response to determining that the offload capability is available and the offload criteria are satisfied, the data flow bypasses the network function module 610. In one example, if the ingress network interface 614 and the egress network interface 616 are available for offloading the data flow but the switch 612 is not, the UPF node 618 processes a data flow according to the transmission path 620*c*. For example, the transmission path 620*c* includes the node 624*a*, the ingress network interface 614, to egress network interface 616, and the node 624*b*.

In some implementations, in response to determining that the offload capability is available and the offload criteria are satisfied, the data flow bypasses the UPF node 618. In one example, both the switch 612 and the network interfaces 614 and 616 are available for offloading the data flow. In such examples, the UPF node 618 determines a transmission path for the data flow based on one or more selection criteria and processes a data flow according to the transmission path 620*b* or the transmission path 620*c*.

Figure 7:
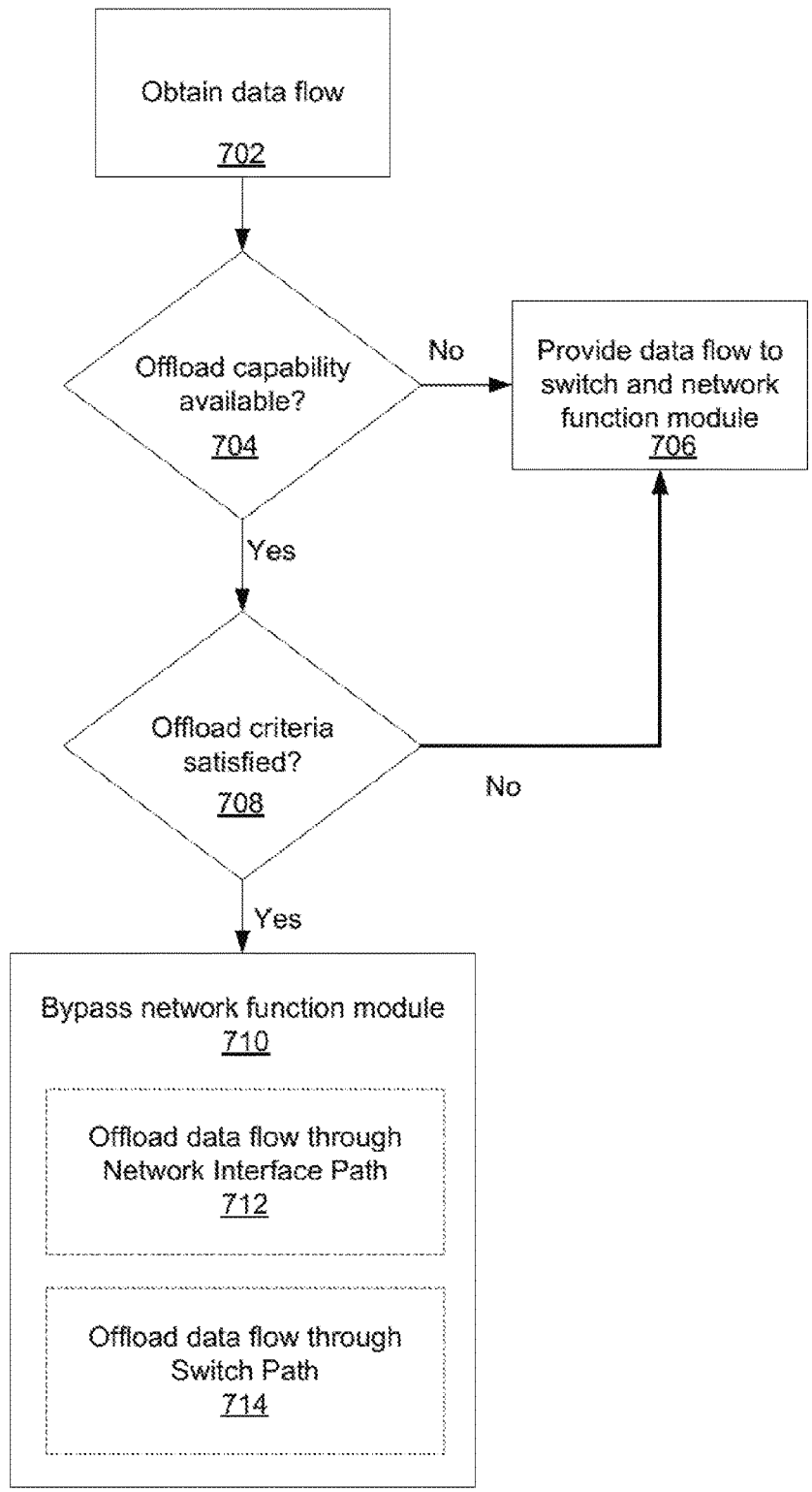
FIG. 7 is a simplified flowchart representation of a method of offloading a data flow in accordance with some implementations.

FIG. 7 is a simplified flowchart representation of a method 700 of offloading a data flow in accordance with some implementations. In various implementations, the method 700 is performed at data plane node (e.g., the UPF node 618 in FIG. 6). While pertinent features are shown, those of ordinary skill in the art will appreciate from the present disclosure that various other features have not been illustrated for the sake of brevity and so as not to obscure more pertinent aspects of the example implementations disclosed herein. To that end, briefly, in some circumstances, the method 700 includes: obtaining a data flow; determining if offload capability is available and determining if offload criteria is satisfied; and bypassing the network function module if the offload capability is available and the offload criteria are satisfied.

In some implementations, as represented by block 702, the method 700 includes obtaining a data flow. For example, with reference to FIG. 6, the node 624*a* transmits a data flow that arrives at the ingress network interface 614 of the UPF node 618. According to some implementations, the UPF node 618 is configured to process data flows serially or in parallel.

In some implementations, as represented by block 704, the method 700 includes determining if an offload capability is available. For example, with reference to FIG. 6, the UPF node 618 determines whether the offload capability of the switch 612 and/or the network interfaces 614 and 616 is available. For example, with continued reference to FIG. 6, determining whether the offload capability is available includes determining whether the network function module 610 in FIG. 6 has access to the switch 612 and/or the network interfaces 614 and 616. In another example, with continued reference to FIG. 6, determining whether the offload capability is available includes determining whether the switch 612 and/or the network interfaces 614 and 616 are programmable.

According to some implementations, if the offload capability is unavailable, the method 700 proceeds to block 706. In some implementations, as represented by block 706, the method 700 includes providing the data flow to the switch and the network function module. For example, with reference to FIG. 6, the UPF node 618 processes the data flow obtained at step 702 via the transmission path 620*a* between the node 624*a* and the node 624*b* when the offload capability is determined to be unavailable. In this example, with continued reference to FIG. 6, the UPF node 618 provides the data flow to both the switch 612 and the network function module 610 in response to determining that the offload capability is unavailable. As such, the data flow is processed by both the switch 612 and the network function module 610. For example, processing the data flow corresponds to GTP encapsulation/decapsulation, network service header (NSH) handling, and/or the like.

According to some implementations, if the offload capability is available, the method 700 proceeds to block 708. In some implementations, as represented by block 708, the method 700 includes determining if the offload criteria are satisfied. For example, with reference to FIG. 6, the UPF node 618 determines whether the data flow at the ingress network interface 614 satisfies the offload criteria. In one example, with reference to FIG. 6, the SDN controller 608 determines whether offload criteria are satisfied. In some implementations, the offload criteria correspond to at least one of a data flow type criterion (e.g., best effort, voice, video, and/or the like), a bandwidth allotment, a latency criterion, a quality of service criterion (e.g., a service level agreement (SLA)), a usage allotment (e.g., number of minutes available/used), a destination IP address criterion, a source IP address criterion, and/or the like.

In some implementations, the offload criteria are satisfied when the data flow is not associated with a blacklist. For example, the blacklist includes at least one of a particular data flow, a particular source, or a particular destination for which the offload capability is not available. In some implementations, the offload criteria are satisfied when the data flow is associated with a whitelist. For example, the whitelist includes at least one of a particular data flow, a particular source, or a particular destination for which the offload capability is available.

According to some implementations, if the offload criteria is not satisfied the method 700 proceeds to block 706. In some implementations, as represented by block 706, the method 700 includes providing the data flow to the switch and the network function module. For example, with reference to FIG. 6, the UPF node 618 processes the data flow obtained at step 702 via the transmission path 620*a* between the node 624a and the node 624b when the data flow is determined to not satisfy the offload criteria.

According to some implementations, if the offload criteria is satisfied the method 700 proceeds to block 710.

In some implementations, as represented by block 710, the method 700 includes bypassing the network function module. For example, with reference to FIG. 6, the UPF node 618 processes the data flow obtained at step 702 via the transmission path 620b or 620c between the node 624a and the node 624b when the offload capability of available and the data flow is determined to satisfy the offload criteria.

In some implementations, as represented by block 712, the method 700 includes offloading the data flow through a network interface path. In one example, with reference to FIG. 6, if the network interfaces 614 and 616 are available for offloading the data flow and the data flow satisfies the offload criteria, the UPF node 618 processes the data flow obtained at step 702 via the transmission path 620c.

In some implementations, as represented by block 714, the method 700 includes offloading the data flow through a switch path. In another example, with reference to FIG. 6, if the switch 612 is available for offloading the data flow and the data flow satisfies the offload criteria, the UPF node 618 processes the data flow obtained at step 702 via the transmission path 620b.

Figure 8:
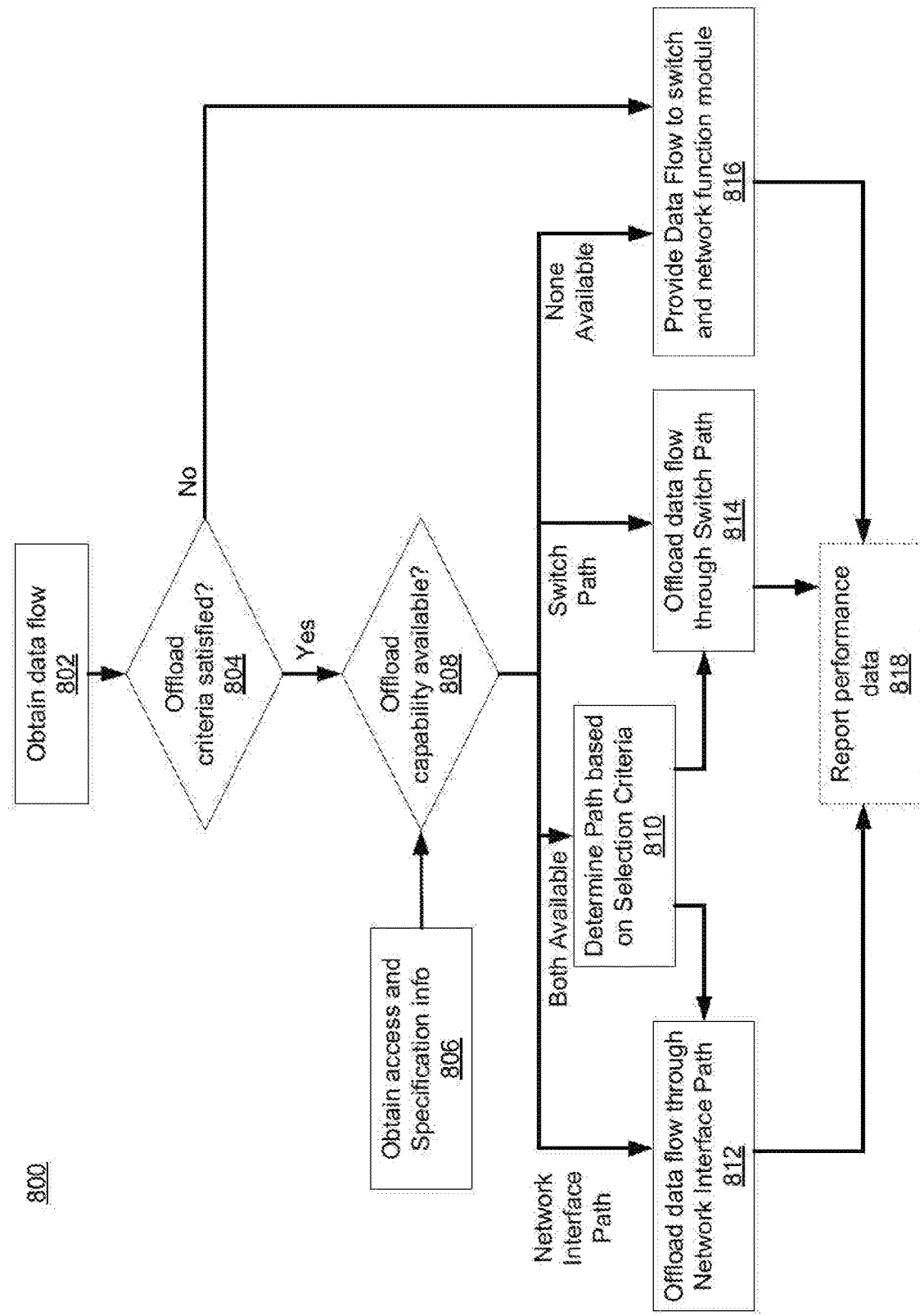
FIG. 8 is a flowchart representation of a method of offloading a data flow in accordance with some implementations.

FIG. 8 is a flowchart representation of a method 800 of offloading a data flow in accordance with some implementations. In various implementations, the method 800 is performed at data plane node (e.g., the UPF node 618 in FIG. 6). While pertinent features are shown, those of ordinary skill in the art will appreciate from the present disclosure that various other features have not been illustrated for the sake of brevity and so as not to obscure more pertinent aspects of the example implementations disclosed herein. To that end, briefly, in some circumstances, the method 800 includes: obtaining a data flow; determining if offload criteria is satisfied; determining if offload capability is available; offloading the data flow through a network interface path or a switch path if the data flow satisfies the offload criteria and the offload capability is available; and providing the data flow to the switch and the network function module if the data flow does not satisfy the offload criteria or the offload capability is unavailable.

In some implementations, as represented by block 802, the method 800 includes obtaining a data flow. For example, with reference to FIG. 6, the node 624a transmits a data flow that arrives at the ingress network interface 614 of the UPF node 618.

In some implementations, as represented by block 804, the method 800 includes determining the offload criteria is satisfied. For example, with reference to FIG. 6, the UPF node 618 determines whether the data flow at the ingress network interface 614 satisfies the offload criteria. In some implementations, the offload criteria correspond to at least one of a data flow type criterion (e.g., best effort, voice, video, and/or the like), a bandwidth allotment, a latency criterion, a quality of service criterion (e.g., a service level agreement (SLA)), a usage allotment (e.g., number of minutes available/used), a destination IP address criterion, a source IP address criterion, and/or the like.

According to some implementations, if the offload criteria is not satisfied, the method 800 proceeds to block 816. In some implementations, as represented by block 816, the method 800 includes providing the data flow to the switch and the network function module. For example, with reference to FIG. 6, the UPF node 618 processes the data flow obtained at step 802 via the transmission path 620a between the node 624a and the node 624b when the data flow is determined to not satisfy the offload criteria.

According to some implementations, if the offload criteria is satisfied the method 800 proceeds to block 808.

In some implementations, as represented by block 806, the method 800 includes obtaining access and specification information. For example, the access and specification information include a switch and network interface type, switch and network interface software and hardware (e.g., software version, hardware elements, etc.), security access to the switch and the network interface (e.g., credentials, switch programmability status, network programmability status, etc.), and/or the like.

In some implementations, as represented by block 808, the method 800 includes determining if an offload capability is available. For example, with reference to FIG. 6, the UPF node 618 determines whether the offload capability of the switch 612 and/or the network interfaces 614 and 616 is available. For example, with continued reference to FIG. 6, determining whether the offload capability is available includes determining whether the network function module 610 in FIG. 6 has access to the switch 612 and/or the network interfaces 614 and 616. In another example, with continued reference to FIG. 6, determining whether the offload capability is available includes determining whether the switch 612 and/or the network interfaces 614 and 616 are programmable.

According to some implementations, if the offload capability is unavailable, the method 800 proceeds to block 816. In some implementations, as represented by block 816, the method 800 includes providing the data flow to the switch and the network function module. For example, with reference to FIG. 6, the UPF node 618 processes the data flow obtained at step 802 via the transmission path 620a between the node 624a and the node 624b when the offload capability is determined to be unavailable. In this example, with continued reference to FIG. 6, the UPF node 618 provides the data flow to both the switch 612 and the network function module 610 in response to determining that the offload capability is unavailable. As such, the data flow is processed by both the switch 612 and the network function module 610. For example, processing the data flow corresponds to GTP encapsulation/decapsulation, network service header (NSH) handling, and/or the like.

According to some implementations, if the data flow satisfies the offload criteria and the switch and network interface paths are both available, the method 800 proceeds to step 810. In some implementations, as represented by step 810, the method 800 includes determining a path based on selection criteria. For example, with reference to FIG. 6, the data flow bypasses the UPF node 618. In such examples, the UPF node 618 determines a transmission path for the data flow based on one or more selection criteria and processes a data flow according to the transmission path 620b or the transmission path 620c.

According to some implementations, if the data flow satisfies the offload criteria and the network interface path is available but not the switch path, the method 800 proceeds to step 812. In some implementations, as represented by step 812, the method 800 includes offloading the data flow through the network interface path. For example, with reference to FIG. 6, the UPF node 618 processes a data flow according to the transmission path 620c. For example, the transmission path 620c includes the node 624a, the ingress network interface 614, to egress network interface 616, and the node 624b.

According to some implementations, if the data flow satisfies the offload criteria and the switch path is available but not the network interface path, the method 800 proceeds to step 814. In some implementations, as represented by step 814, the method 800 includes offloading the data flow through the switch. For example, with reference to FIG. 6, the UPF node 618 processes a data flow according to the transmission path 620b. For example, the transmission path 620b includes the node 624a, the ingress network interface 614, the switch 612, the egress network interface 616, and the node 624b.

According to some implementations, if the data flow does not satisfy the offload criteria or the offload capability is not available, the method 800 proceeds to step 816. In some implementations, as represented by step 816, the method 800 includes providing the data flow to the switch and the network function module. For example, with reference to FIG. 6, the UPF node 618 processes the data flow obtained at step 802 via the transmission path 620a between the node 624a and the node 624b when the offload capability is determined to be unavailable. In this example, with continued reference to FIG. 6, the UPF node 618 provides the data flow to both the switch 612 and the network function module 610 in response to determining that the offload capability is unavailable. As such, the data flow is processed by both the switch 612 and the network function module 610. For example, processing the data flow corresponds to GTP encapsulation/decapsulation, network service header (NSH) handling, and/or the like.

In some implementations, as represented by block 818, the method 800 optionally includes reporting performance data. For example, the performance data correspond to at least one of a data flow performance (e.g., best effort, voice quality, video quality, and/or the like), bandwidth allotment data, latency data, quality of service data (e.g., a service level agreement (SLA)), usage allotment data (e.g., number of minutes available/used), and/or the like.

Figure 9:
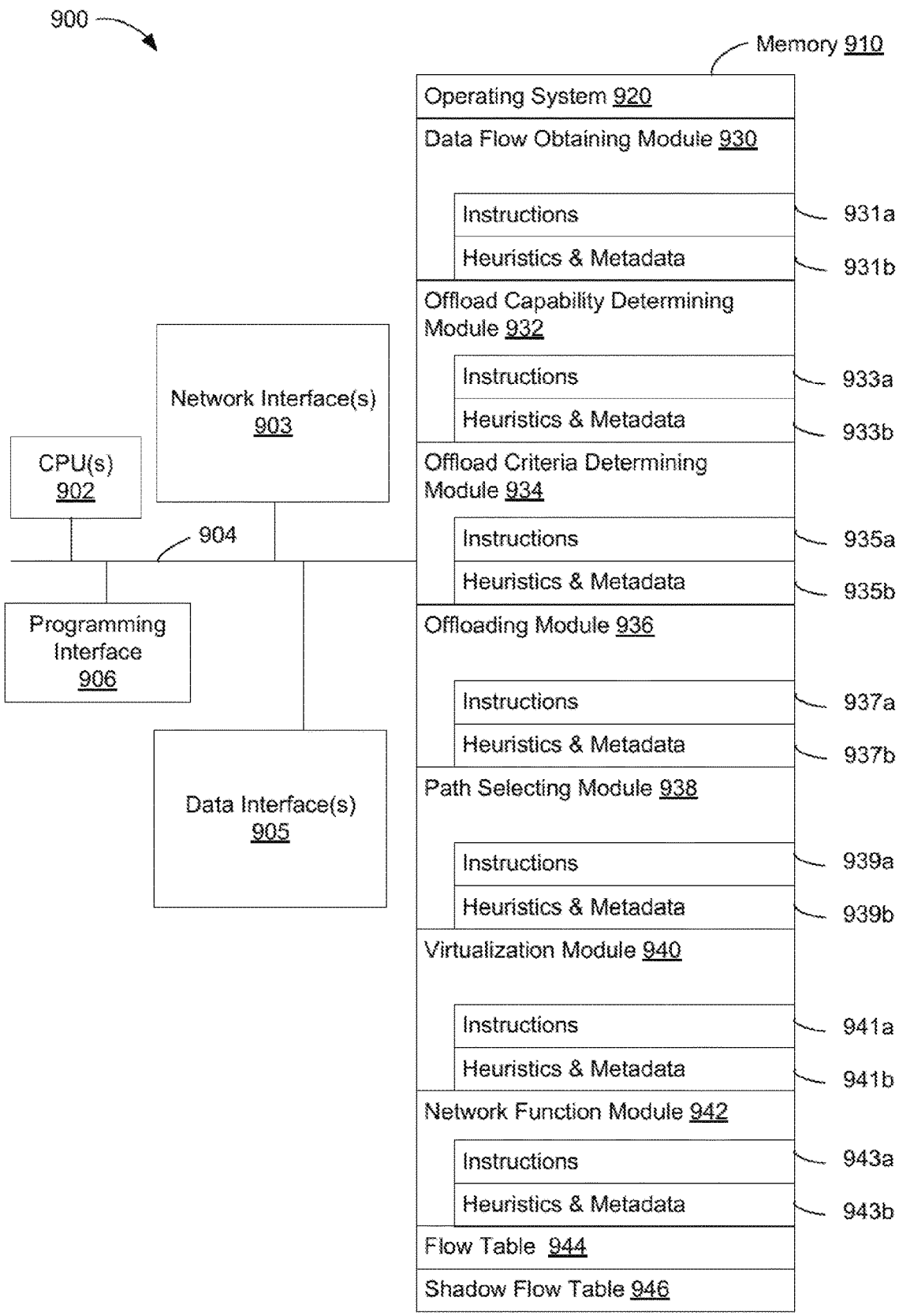
FIG. 9 is a block diagram of an example device in accordance with some implementations.

FIG. 9 is a block diagram of an example device 900 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, the device 900 corresponds to the UPF node 618 in FIG. 6. In some implementations, the device 900 includes one or more processing units (CPUs) 902, one or more network interfaces 903, one or more data interfaces 905, a programming (I/O) interface 906, a memory 910, and one or more communication buses 904 for interconnecting these and various other components.

In some implementations, the one or more network interfaces 903 is configured to obtain (e.g., receive and/or retrieve) data flows.

In some implementations, the one or more communication buses 904 include circuitry that interconnects and controls communications between system components.

In some implementations, the one or more data interfaces 905 are configured to obtain (e.g., receive and/or retrieve) data flows.

In some implementations, the programming interface 906 includes a set of subroutine definitions, protocols, tools, and/or the like for communications between system components.

The memory 910 includes high-speed random-access memory, such as DRAM, SRAM, DDR RAM, or other random access solid state memory devices. In some implementations, the memory 910 includes non-volatile memory, such as one or more magnetic disk storage devices, optical disk storage devices, flash memory devices, or other non-volatile solid-state storage devices. The memory 910 optionally includes one or more storage devices remotely located from the one or more CPUs 902. The memory 910 comprises a non-transitory computer readable storage medium. In some implementations, the memory 910 or the non-transitory computer readable storage medium of the memory 910 stores the following programs, modules and data structures, or a subset thereof including an optional operating system 920, a data flow obtaining module 930, an offload capability determining module 932, an offload criteria determining module 934, an offloading module 936, a path selecting module 938, a virtualization module 940, a network function module 942, a flow table 944, and a shadow flow table 946.

The operating system 920 includes procedures for handling various basic system services and for performing hardware dependent tasks.

In some implementations, the data flow obtaining module 930 is configured to obtain a data flow at, for example, an ingress interface among the one or more network interfaces 903. For example, with reference to FIG. 6, the node 624a transmits a data flow that arrives at the ingress network interface 614 of the UPF node 618. To that end, in various implementations, the data flow obtaining module 930 includes instructions and/or logic 931a, and heuristics and metadata 931b.

In some implementations, the offload capability module 932 is configured to determine if offload capability is available. For example, with reference to FIG. 6, the UPF node 618 determines whether the offload capability of the switch 612 and/or the network interfaces 614 and 616 is available. For example, with continued reference to FIG. 6, determining whether the offload capability is available includes determining whether the network function module 610 in FIG. 6 has access to the switch 612 and/or the network interfaces 614 and 616. In another example, with continued reference to FIG. 6, determining whether the offload capability is available includes determining whether the switch 612 and/or the network interfaces 614 and 616 are programmable.

To that end, in various implementations, the offload capability module 932 includes instructions and/or logic 933a, and heuristics and metadata 933b.

In some implementations, the offload criteria determining module 934 is configured to determine if the offload criteria are satisfied. For example, with reference to FIG. 6, the UPF node 618 determines whether the data flow at the ingress network interface 614 satisfies the offload criteria. In one example, with reference to FIG. 6, the SDN controller 608 determines whether offload criteria are satisfied. In some implementations, the offload criteria correspond to at least one of a data flow type criterion (e.g., best effort, voice, video, and/or the like), a bandwidth allotment, a latency criterion, a quality of service criterion (e.g., a service level agreement (SLA)), a usage allotment (e.g., number of minutes available/used), a destination IP address criterion, a source IP address criterion, and/or the like.

To that end, in various implementations, the offload criteria determining module 934 includes instructions and/or logic 935a, and heuristics and metadata 935b.

In some implementations, the offloading module 936 is configured to effectuate the data routing after determining offload capability and offload criteria. To that end, in various implementations, the offloading module 936 includes instructions and/or logic 937a, and heuristics and metadata 937b.

In some implementations, the path selecting module 938 is configured to select a path based on selection criteria. For example, with reference to FIG. 6, the data flow bypasses the UPF node 618. In such examples, the UPF node 618 determines a transmission path for the data flow based on one or more selection criteria and processes a data flow according to the transmission path 620b or the transmission path 620c. To that end, in various implementations, the path determining module 938 includes instructions and/or logic 939a, and heuristics and metadata 939b.

In some implementations, the virtualization module 940 is configured to provide virtualized hardware such as a virtual switch. To that end, in various implementations, the virtual module 940 includes instructions and/or logic 941a, and heuristics and metadata 941b.

In some implementations, the network function module 942 corresponds to a VNF that is associated with a guest, virtual machine, a network application, or the like. For example, the VNF corresponds to the one or more VNFs 306 in FIG. 3. To that end, in various implementations, the network function module 942 includes instructions and/or logic 943a, and heuristics and metadata 943b.

In some implementations, the flow table 944 is configured to store a plurality of entries that corresponds to a list of particular data flows. For example, with reference to FIG. 5, a switch 508 uses the flow table 504 to index and access the list of the particular data flows. In another example, the flow table 504 supports the network function module 502 by enhancing traffic forwarding capability of the network function module 502. In some implementations, the flow table is used by the network function module 502 for traffic classification.

In some implementations, the shadow flow table 946 is configured to store a plurality of entries similar to the data to the corresponding flow table 944. In some implementations, the shadow flow table 946 is a subset of the flow table 944. In some implementations, the shadow flow table 946 is configured to be in the same format as the corresponding flow table 644. In some implementations, the shadow flow table 946 stores information relating to a history of modifications and functions operated on the flow table 944.

Although the data flow obtaining module 930, the offload capability determining module 932, the offload criteria determining module 934, the offloading module 936, the path selecting module 938, the virtualization module 940, the network function module 942, the flow table 944, and the shadow flow table 946 are shown as residing on a single device (e.g., the device 900), it should be understood that in other implementations, any combination of the data flow obtaining module 930, the offload capability determining module 932, the offload criteria determining module 934, the offloading module 936, the path selecting module 938, the virtualization module 940, the network function module 942, the flow table 944 reside in separate computing devices.

Moreover, FIG. 9 is intended more as functional description of the various features which be present in a particular implementation as opposed to a structural schematic of the implementations described herein. As recognized by those of ordinary skill in the art, items shown separately could be combined and some items could be separated. For example, some functional modules shown separately in FIG. 9 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a data plane node having an ingress network interface, an egress network interface, and a control interface between a network function module associated with the data plane node and a switch associated with the data plane node:
  determining whether an offload capability is available at the egress network interface or the switch for a data flow received at the ingress network interface;
  when the offload capability is available at the egress network interface or the switch, determining whether the data flow satisfies at least an offload criterion that is based in part on at least one of a data flow type and a quality requirement of the data flow; and
  when the offload criterion is satisfied:
    determining, based on at least one selection criterion, whether to provide the data flow to the switch or to the egress network interface;
    when the at least one selection criterion is not satisfied, bypassing the network function module and providing the data flow to the switch; and
    when the at least one selection criterion is satisfied, bypassing the network function module and providing the data flow to the egress network interface.

2. The method of claim 1, wherein determining whether the offload capability is available includes determining whether the data plane node has access to the switch and determining whether the switch is programmable.

3. The method of claim 1, wherein determining whether the offload capability is available includes determining whether the data plane node has access to the egress network interface and determining whether the egress network interface is programmable.

4. The method of claim 1, wherein providing the data flow to the switch includes providing the data flow to the switch when the offload capability is available at the switch and not at the egress network interface.

5. The method of claim 1, wherein providing the data flow to the egress network interface includes providing the data flow to the egress network interface when the offload capability is available at the egress network interface and not at the switch.

6. The method of claim 1, wherein the quality requirement comprises at least one of a bandwidth criterion of the data flow, a latency criterion of the data flow, or a quality of service criterion of the data flow.

7. The method of claim 1, further comprising:
  providing the data flow to both the switch and the network function module when the offload capability is not available, wherein the data flow is processed by both the switch and the network function module.

8. The method of claim 1, further comprising:
  providing the data flow to both the switch and the network function module when the data flow does not satisfy the offload criterion, wherein the data flow is processed by both the switch and the network function module.

9. The method of claim 1, wherein the offload criterion is further based on at least one of a destination internet protocol (IP) address criterion, a source IP address criterion, a bandwidth allotment, a latency criterion, a quality of service criterion, or a usage allotment.

10. The method of claim 1, wherein the offload criterion is satisfied when the data flow is not associated with a blacklist, wherein the blacklist includes at least one of a particular data flow, a particular source, or a particular destination for which the offload capability is not available.

11. The method of claim 1, wherein the offload criterion is satisfied when the data flow is associated with a whitelist, wherein the whitelist includes at least one of a particular data flow, a particular source, or a particular destination for which the offload capability is available.

12. A device comprising:
  an ingress network interface;
  an egress network interface;
  a network function module;
  a switch;
  one or more processors;
  a non-transitory memory; and
  one or more programs stored in the non-transitory memory, which, when executed by the one or more processors, cause the device to:
    determine whether an offload capability is available at the egress network interface or the switch for a data flow received at the ingress network interface;
    when the offload capability is available at the egress network interface or the switch, determine whether the data flow satisfies at least an offload criterion that is based in part on at least one of a data flow type and a quality requirement of the data flow; and
    when the offload criterion is satisfied:
      determine, based on at least one selection criterion, whether to provide the data flow to the switch or to the egress network interface;
      when the at least one selection criterion is not satisfied, bypass the network function module and provide the data flow to the switch; and
      when the at least one selection criterion is satisfied, bypass the network function module and provide the data flow to the egress network interface.

13. The device of claim 12, wherein the one or more programs cause the device to provide the data flow to the switch by providing the data flow to the switch when the offload capability is available at the switch and not at the egress network interface.

14. The device of claim 12, wherein the one or more programs cause the device to provide the data flow to the egress network interface by providing the data flow to the egress network interface when the offload capability is available at the egress network interface and not at the switch.

15. The device of claim 12, wherein the one or more programs cause the device to determine whether the offload capability is available by determining whether the device has access to the switch and determining whether the switch is programmable.

16. The device of claim 12, wherein the one or more programs cause the device to determine whether the offload capability is available by determining whether the device has access to the egress network interface and determining whether the egress network interface is programmable.

17. The device of claim 12, wherein the quality requirement comprises at least one of a bandwidth criterion of the data flow, a latency criterion of the data flow, or a quality of service criterion of the data flow.

18. A non-transitory memory storing one or more programs, which, when executed by one or more processors of a data plane node with non-transitory memory, an ingress network interface, an egress network interface, a control interface between a network function module associated with the data plane node, and a switch associated with the data plane node, cause the data plane node to:
  determine whether an offload capability is available at the egress network interface or the switch for a data flow received at the ingress network interface;
  when the offload capability is available at the egress network interface or the switch, determine whether the data flow satisfies an offload criterion that is based in part on at least one of a data flow type and a quality requirement of the data flow; and when the offload criterion is satisfied:
determine, based on at least one selection criterion, whether to provide the data flow to the switch or to the egress network interface;
when the at least one selection criterion is not satisfied, bypass the network function module and provide the data flow to the switch; and
when the at least one selection criterion is satisfied, bypass the network function module and provide the data flow to the egress network interface.

19. The non-transitory memory of claim 18, wherein the one or more programs cause the data plane node to:
provide the data flow to the switch when the offload capability is available at the switch and not at the egress network interface, wherein the data flow is processed by the switch.

20. The non-transitory memory of claim 18, wherein the one or more programs cause the data plane node to:
provide the data flow to the egress network interface when the offload capability is available at the egress network interface and not at the switch.

* * * * *